United States Patent
Ahmadi et al.

(10) Patent No.: US 12,542,775 B2
(45) Date of Patent: Feb. 3, 2026

(54) SECURE FILE TRANSFER

(71) Applicant: T-Mobile Innovations LLC, Overland Park, KS (US)

(72) Inventors: Salman Karimpour Ahmadi, Mill Creek, WA (US); Jianchong Yang, Issaquah, WA (US); Lei Zhu, Bellevue, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 99 days.

(21) Appl. No.: 18/664,272

(22) Filed: May 14, 2024

(65) Prior Publication Data
US 2025/0358278 A1    Nov. 20, 2025

(51) Int. Cl.
*H04L 9/40* (2022.01)
*H04L 67/06* (2022.01)

(52) U.S. Cl.
CPC .......... *H04L 63/083* (2013.01); *H04L 63/029* (2013.01); *H04L 63/0876* (2013.01); *H04L 67/06* (2013.01)

(58) Field of Classification Search
CPC . H04L 63/083; H04L 63/029; H04L 63/0876; H04L 67/06
See application file for complete search history.

(56) References Cited

U.S. PATENT DOCUMENTS

| 11,895,066 B2 | 2/2024 | Dar et al. |
| 12,206,633 B2 | 1/2025 | Dar et al. |
| 2006/0031560 A1 * | 2/2006 | Warshavsky ............ H04L 51/04 709/232 |
| 2008/0170677 A1 | 7/2008 | Kutt et al. |
| 2009/0077227 A1 | 3/2009 | Force et al. |
| 2009/0313256 A1 | 12/2009 | Konduri et al. |

(Continued)

FOREIGN PATENT DOCUMENTS

| CN | 113934994 A1 | 1/2022 |
| CN | 115525307 A1 | 12/2022 |

(Continued)

OTHER PUBLICATIONS

Notice of Allowance dated Sep. 24, 2024, U.S. Appl. No. 18/391,605, filed Dec. 20, 2023.

(Continued)

*Primary Examiner* — Bryan Y Lee

(57) ABSTRACT

Methods, systems, and apparatus, including computer programs encoded on a computer storage medium, for transferring files securely data are disclosed. In one aspect, a method includes the actions of receiving, by a content management application, a file and a request to provide the file to the second computing device. The actions further include providing, by the content management application and to the first computing device, the link to the file and the password to access the link. The actions further include providing, to the first computing device via the MSRP tunnel, the link to the file and the password to access the link. The actions further include receiving, by the content management application, a request for the file, the link to the file, and the password to access the link. The actions further include providing, to the second computing device, the file.

20 Claims, 5 Drawing Sheets

(56) References Cited

U.S. PATENT DOCUMENTS

| | | | |
|---|---|---|---|
| 2014/0059118 A1* | 2/2014 | Pidady | H04L 67/563 709/203 |
| 2014/0108568 A1 | 4/2014 | Lee | |
| 2016/0072745 A1 | 3/2016 | Kubik et al. | |
| 2017/0272316 A1 | 9/2017 | Johnson et al. | |
| 2018/0139247 A1 | 5/2018 | Lin | |
| 2020/0099789 A1 | 3/2020 | Miller et al. | |
| 2020/0304574 A1 | 9/2020 | Gupta et al. | |
| 2023/0246985 A1* | 8/2023 | Dar | H04L 67/06 709/206 |
| 2024/0129261 A1 | 4/2024 | Dar et al. | |

FOREIGN PATENT DOCUMENTS

| | | |
|---|---|---|
| EP | 3313037 A1 | 4/2018 |
| EP | 3531670 A1 | 8/2019 |
| WO | 2010050817 A1 | 5/2010 |
| WO | 2012022357 A1 | 2/2012 |

OTHER PUBLICATIONS

Dar, Sheraz F., et al., "Real-time Chat Service File Transfer Across Different Networks," filed Dec. 20, 2023, U.S. Appl. No. 18/391,605.

Restriction Requirement dated Dec. 30, 2022, U.S. Appl. No. 17/591,433, filed Feb. 2, 2022.

Office Action dated Feb. 2, 2023, U.S. Appl. No. 17/591,433, filed Feb. 2, 2022.

Final Office Action dated Aug. 10, 2023, U.S. Appl. No. 17/591,433, filed Feb. 2, 2022.

Notice of Allowance dated Sep. 27, 2023, U.S. Appl. No. 17/591,433, filed Feb. 2, 2022.

\* cited by examiner

```
┌─────────────────────────────────────────────────────────────────────┐
│ Receive, by a messaging application and from a first computing      │
│ device, a request to initiate a chat session with a second          │
│ computing device                                              305   │
└─────────────────────────────────────────────────────────────────────┘
                                  ▼
┌─────────────────────────────────────────────────────────────────────┐
│ In response to receiving the request to initiate the chat session,  │
│ initialize, by the messaging application, a message session relay   │
│ protocol (MSRP) tunnel between the first computing device and the   │
│ second computing device                                       310   │
└─────────────────────────────────────────────────────────────────────┘
                                  ▼
┌─────────────────────────────────────────────────────────────────────┐
│ Receive, by a content management application and from the first    │
│ computing device, a file and a request to provide the file to the   │
│ second computing device                                       315   │
└─────────────────────────────────────────────────────────────────────┘
                                  ▼
┌─────────────────────────────────────────────────────────────────────┐
│ In response to the request to provide the file to the second        │
│ computing device, determine, by the content management application, │
│ a link to the file and a password to access the link          320   │
└─────────────────────────────────────────────────────────────────────┘
                                  ▼
┌─────────────────────────────────────────────────────────────────────┐
│ Provide, by the content management application and to the first     │
│ computing device, the link to the file and the password to access   │
│ the link                                                      325   │
└─────────────────────────────────────────────────────────────────────┘
                                  ▼
┌─────────────────────────────────────────────────────────────────────┐
│ Receive, by the messaging application and from the first computing  │
│ device via the MSRP tunnel, the link to the file and the password   │
│ to access the link                                            330   │
└─────────────────────────────────────────────────────────────────────┘
                                  ▼
┌─────────────────────────────────────────────────────────────────────┐
│ Determine, by the messaging application, that the second computing  │
│ device and the messaging application are not communicating by the   │
│ MRSP tunnel or an additional MSRP tunnel                      335   │
└─────────────────────────────────────────────────────────────────────┘
                                  ▼
┌─────────────────────────────────────────────────────────────────────┐
│ Provide, by the messaging application and to the second computing   │
│ device, the link to the file and the password to access the link    │
│ such that the link to the file and the password to access the link  │
│ is visible to a user of the second computing device           340   │
└─────────────────────────────────────────────────────────────────────┘
                                  ▼
┌─────────────────────────────────────────────────────────────────────┐
│ Receive, by the content management application and from the second  │
│ computing device, a request for the file and the link to the file   │
│                                                               345   │
└─────────────────────────────────────────────────────────────────────┘
                                  ▼
┌─────────────────────────────────────────────────────────────────────┐
│ Provide, by the content management application and to the second    │
│ computing device, a request for the password to access the link     │
│                                                               350   │
└─────────────────────────────────────────────────────────────────────┘
                                  ▼
┌─────────────────────────────────────────────────────────────────────┐
│ Receive, by the content management application and from the second  │
│ computing device, the password to access the link             355   │
└─────────────────────────────────────────────────────────────────────┘
                                  ▼
┌─────────────────────────────────────────────────────────────────────┐
│ In response to receiving the password to access the link, provide,  │
│ by the content management application and to the second computing  │
│ device, the file                                              360   │
└─────────────────────────────────────────────────────────────────────┘
```

300 ⤴                          FIG. 3

SECURE FILE TRANSFER

CROSS-REFERENCE TO RELATED APPLICATION

None.

STATEMENT REGARDING FEDERALLY SPONSORED RESEARCH OR DEVELOPMENT

None.

REFERENCE TO A MICROFICHE APPENDIX

None.

BACKGROUND

Online chat may include any kind of communication that offers a real-time transmission of messages from sender to receiver over a network. Chat messages are generally short in order to enable other participants to respond quickly. Thereby, a feeling similar to a spoken conversation is created, which distinguishes chatting from other text-based online communication forms such as email.

File transfer is the transmission of a computer file through a communication channel from one computer system to another. Typically, file transfer is mediated by a communications protocol. Some online chat applications include the ability to transfer files such as media files, documents, etc.

SUMMARY

An innovative aspect of the subject matter described in this specification may be implemented in methods that include the actions of receiving, by a messaging application and from a first computing device, a request to initiate a chat session with a second computing device; in response to receiving the request to initiate the chat session, initializing, by the messaging application, a Message Session Relay Protocol (MSRP) tunnel between the first computing device and the second computing device; receiving, by a content management application and from the first computing device, a file and a request to provide the file to the second computing device; in response to the request to provide the file to the second computing device, determining, by the content management application, a link to the file and a password to access the link; providing, by the content management application and to the first computing device, the link to the file and the password to access the link; receiving, by the messaging application and from the first computing device via the MSRP tunnel, the link to the file and the password to access the link; providing, by the messaging application and to the second computing device via the MSRP tunnel, the link to the file and the password to access the link; receiving, by the content management application and from the second computing device, a request for the file, the link to the file, and the password to access the link; and in response to receiving the request for the file, the link to the file, and the password to access the link, providing, by the content management application and to the second computing device, the file.

Another innovative aspect of the subject matter described in this specification may be implemented in methods that include the actions of receiving, by a messaging application and from a first computing device, a request to initiate a chat session with a second computing device; in response to receiving the request to initiate the chat session, initializing, by the messaging application, a message session relay protocol (MSRP) tunnel between the first computing device and the second computing device; receiving, by a content management application and from the first computing device, a file and a request to provide the file to the second computing device; in response to the request to provide the file to the second computing device, determining, by the content management application, a link to the file and a password to access the link; providing, by the content management application and to the first computing device, the link to the file and the password to access the link; receiving, by the messaging application and from the first computing device via the MSRP tunnel, the link to the file and the password to access the link; determining, by the messaging application, that the second computing device and the messaging application are not communicating by the MSRP tunnel or an additional MSRP tunnel; providing, by the messaging application and to the second computing device, the link to the file and the password to access the link such that the link to the file and the password to access the link is visible to a user of the second computing device; receiving, by the content management application and from the second computing device, a request for the file and the link to the file; providing, by the content management application and to the second computing device, a request for the password to access the link; receiving, by the content management application and from the second computing device, the password to access the link; and, in response to receiving the password to access the link, providing, by the content management application and to the second computing device, the file.

Another innovative aspect of the subject matter described in this specification may be implemented in methods that include the actions of receiving, by a messaging application and from a first computing device, a request to initiate a chat session with a second computing device; in response to receiving the request to initiate the chat session, initializing, by the messaging application, a Message Session Relay Protocol (MSRP) tunnel between the first computing device and the second computing device; receiving, by a content management application and from the first computing device, a file and a request to provide the file to the second computing device; in response to the request to provide the file to the second computing device, determining, by the content management application, a link to the file and a password to access the link; providing, by the content management application and to the first computing device, the link to the file; receiving, by the messaging application and from the first computing device via the MSRP tunnel, the link to the file; providing, by the messaging application and to the second computing device via the MSRP tunnel, the link to the file; receiving, by the content management application and from the second computing device, a request for the file, the link to the file, and the password to access the link; and, in response to receiving the request for the file, the link to the file, and the password to access the link, providing, by the content management application and to the second computing device, the file.

Other implementations of this aspect include corresponding systems, apparatus, and computer programs recorded on computer storage devices, each configured to perform the operations of the methods.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 is a flowchart of an example process for securely transferring a file from a first computing device to a second computing device during a chat session and while the second computing device has disconnected from the network and reconnected to another network.

DETAILED DESCRIPTION

Figure 1:
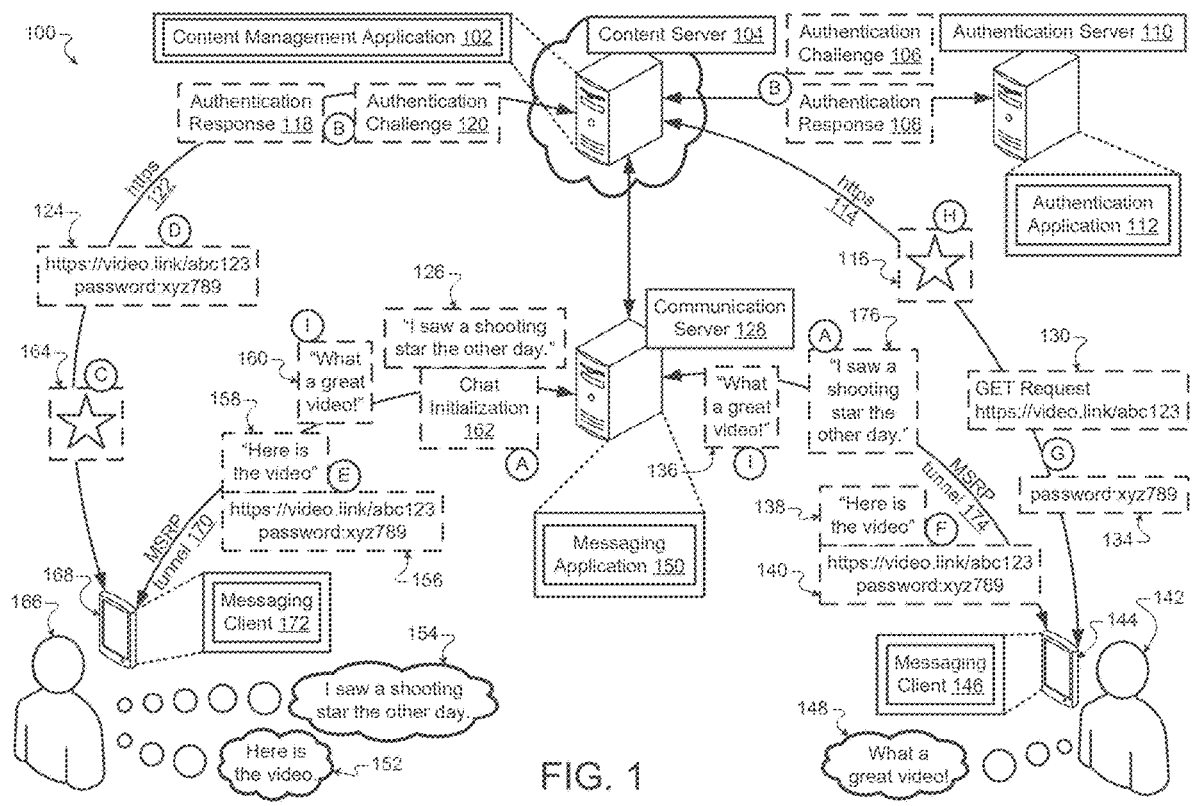
FIG. 1 illustrates an example system that is configured to securely transfer a file from a first computing device to a second computing device during a chat session.

It should be understood at the outset that although illustrative implementations of one or more implementations are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Sending a file during a chat session may appear to be a straight forward process to the users participating in the chat session. The reality is that sending a file during a chat session involves a more complex series of operations than sending text-based message during a chat session. For example, during a chat session that is using multimedia messaging service, a user may attempt to send a photo to another user. A server may receive the file, convert the file to a link, and send the link to the other user. The device of the other user downloads the file from the server using the link.

Using links to send files can be a security risk. Anyone who has access to the link can access the file. To mitigate this security risk, it may be beneficial to update the process used to send files during chat sessions. This update may involve securing the links to the files and utilizing specific communication channels during the chat session and during the sending and receiving of files.

Before the chat session begins and after a user indicates to initiate a chat session with another user, the computing device of the user may communicate with a content server that is in communication with a boot strap function server, or authentication server. The content server receives a device token from the computing device of the user. The content server authenticates the device token against the boot strap function server. If the authentication is successful, then the computing device of the user initiates a Message Session Relay Protocol (MSRP) tunnel between the computing device of the user and the communication server and between the computing device of the other user and the communication server.

During the chat session, the user may select a file to send to the other user. The computing device of the user provides the file to the content server over a Hypertext Transfer Protocol Secure (HTTPS) connection. The content server returns a link to the file and a password to access the link over the HTTPS connection. The computing device of the user may send the link and the password through the MSRP tunnel to the communication server. The sending of the link and the password to the communication server may be invisible to the user of the computing device.

The communication server receives the link and the password and transmits them to the computing device of the other user over the MSRP tunnel. The computing device of the other user receives the link and the password. The computing device of the other user generates an HTTPS GET request that includes the link and provides the HTTPS GET request to the content server. The computing device of the other user may provide the password to the content server outside of the HTTPS GET request.

In response to receiving the HTTPS GET request and the password, the content server accesses the file and provides the file to the computing device of the other user. The movement of the link and the password between the communication server and the computing device of the other user and between the content server and the computing device of the other user may be invisible to the other user. The other user may only see the receipt of the file from the user.

By using password protected links and transmitting the link to the file and the password over MSRP, the system is able to accomplish two goals. First, the transmission and receipt of the file appears seamless to the users participating in the chat session. The sending user sees their file being sent to the receiving user. The receiving user sees the file appear in the chat session. Because transmitting the link and password occurs over MSRP, that process is hidden from the users. Second, using MSRP to send the link and passwords protects the link and the password from being intercepted by a third party.

In the case of multiple participants in the chat session, it may be beneficial to transmit the link to the file and the password to the link over MSRP. By transmitting the link to the file and the password to each of the multiple recipients, each recipient is able to access the link and the file at a time of their choosing. This flexibility avoids the case of the server sending multiple copies of the file to each of the recipient devices at approximately the same time. Spreading out the accesses over a period of time, even a short period of time, is an improvement over sending multiple copies of the file at approximately the same time. This improvement helps to reduce the amount of computing resources needed to manage chat sessions.

FIG. 1 illustrates an example system 100 that is configured to securely transfer a file 164, 116 from a first computing device 168 to a second computing device 144 during a chat session. Briefly, and as described in more detail below, the user 166 may be participating in a chat session with the user 142. The user 166 may wish to send a large file 164 to the user 142 during the chat session. In order for the file 164 to remain secure, the messaging application 150 may coordinate with the content management application 102 that generates a link and a password for the file 164. The second computing device 144 of the user 142 receives the link and the password in the background and downloads the file 116 over a hypertext transfer protocol secure (HTTPS) connection. The second computing device 144 presents the file 116 to the user 142. FIG. 1 includes various stages A through I that may illustrate the performance of actions and/or the movement of data between various components of the system 100. The system 100 may perform these stages in any order.

In more detail, the user 166 may be interacting with a first computing device 168. The user 166 may be attempting to communicate with the user 142 through the messaging client 172 that is running on the first computing device 168. The first computing device 168 may be any type of device that is configured to communicate with other computing devices. For example, the first computing device 168 may be a mobile phone, laptop computer, desktop computer, tablet, smart watch, server, and/or any other similar type of device. The messaging client 172 may be a native application that is running on the first computing device 168 or a browser-based application that is running inside a browser that is running on the first computing device 168.

In stage A, the user 166 may access the messaging client 172 and initiate a communication with the user 142. The user 166 may enter an identifier for the user 142 such as a phone number, user name, email address, and/or any other similar identifier. In some implementations, the user 166 may select a previous communication with the user 142 or select the user 142 from an address book. The user 166 may input an initial communication to the user 142. The user 166 may input the text 154, "I saw a shooting star the other day." The user 166 may type the text 154 or speak the text 154. In the case of the user 166 speaking the text 154, the messaging client 172 may be configured to generate a transcription of the speech of the user 166.

In response to the input from the user 166 to initiate the communication and/or inputting the communication from the user 166, the messaging client 172 may generate a chat initialization packet 162. The chat initialization packet 162 may include data identifying the user 166, the first computing device 168, the messaging client 172, and/or any other similar type of information. The chat initialization packet 162 may also include data identifying the user 142, the second computing device 144, the messaging client 146 running on the second computing device 144, and/or any other similar type of information. The chat initialization packet 162 may indicate that the first computing device 168 generated the chat initialization packet 162 and that the chat initialization packet 162 is intended for second computing device 144. The messaging client 172 may transmit, to the communication server 128, the chat initialization packet 162 and an additional text packet 126 that includes the text 154 inputted by the user 166. In some implementations, the chat initialization packet 162 and the text packet 126 may be included in a same packet. The chat initialization packet 162 and/or the text packet 126 may be in a format according to messaging protocol that the messaging client 172 is attempting to communicate.

In some implementations, the communication server 128 may be incorporated into the network with which the first computing device 168 is communicating. For example, the communication server 128 may be incorporated into the equipment of a wireless carrier network that provides wireless service to the first computing device 168. In some implementations, the communication server 128 may be a third-party server that is operated, managed, and/or owned by an entity other than the wireless carrier.

The communication server 128 may be running a messaging application 150. The messaging application 150 is configured to manage communications to and from the messaging client 172 and other similar messaging clients. The messaging application 150 may be configured to receive communication packets that include a communication from a user and data identifying a recipient and transmit those communication packets to the recipient. In some implementations, the messaging application 150 may manage one or more types of communication or communication protocols. For example, the messaging application 150 may manage short messaging service (SMS) communications, rich communication service (RCS) communications, multimedia messaging service (MMS) communications, and/or any other similar type of communication. In some implementations, the messaging application 150 may manage one or more of those types of communications, and other applications that may or may not be included in the communication server 128 will manage other types communications.

In response to receiving the chat initialization packet 162, the messaging application 150 may analyze the chat initialization packet 162. Based on analyzing the chat initialization packet 162, the messaging application 150 may determine the computing device involved in the communication. For example, the computing devices involved in the communication may include the first computing device 168 and the second computing device 144. As another example, the computing devices involved in the communication may include more than two computing devices. The messaging application 150 may determine characteristics of the computing devices involved in the communication. The characteristics of the computing devices may include the types of communication that the computing devices are able to support such as SMS, MMS, RCS, and/or any other similar type of communication. The characteristics of the computing devices may also include data identifying the messaging applications, model of device, wireless network provider, and/or any other similar characteristic. The messaging application 150 may determine the types of communication that the computing devices are able to support based on these characteristics.

In the example of FIG. 1, the messaging application 150 may analyze the characteristics of the first computing device 168 and the second computing device 144 and the corresponding messaging clients. The messaging application 150 may determine that the messaging client 172 and the messaging client 146 can be connected by a message session relay protocol (MSRP) tunnel. The messaging application 150 may establish an MSRP tunnel 170 between the messaging client 172 and the messaging application 150 and a MSRP tunnel 174 between the messaging application 150 and the messaging client 146. In some implementations, the messaging client 172 and the messaging client 146 may be connected by other protocols other than MSRP that is suitable for communication between the messaging client 172 and the messaging client 146 or an evolvement of MSRP.

In some implementations, before or in parallel with initializing the MSRP tunnel 170 and/or the MSRP tunnel 174, the messaging application 150 may communicate with the content server 104 and/or the authentication server 110. The messaging application 150 may request to authenticate the user 166, the messaging client 172, and/or the first computing device 168. In response to receiving the authentication request, the authentication server 110 may initiate an authentication sequence.

The authentication server 110 may be any type of device that is configured to communicate with other computing devices. For example, the authentication server 110 may be a mobile phone, laptop computer, desktop computer, tablet, smart watch, server, and/or any other similar type of device. The authentication server 110 may run an authentication application 112. The authentication application 112 may be configured to authenticate computing devices and/or users that are attempting to access a network, an application, data, and/or any other restricted item.

The content server 104 may be any type of device that is configured to communicate with other computing devices. For example, the content server 104 may be a mobile phone, laptop computer, desktop computer, tablet, smart watch, server, and/or any other similar type of device. The content server 104 may run a content management application 102. The content management application 102 may be configured to receive, store, output, and provide access to various types of files such as media files or any type of data object.

In stage B, the authentication application 112 may initiate an authentication sequence of the first computing device 168. This initiation may be in response to a request that originates from the first computing device 168, the communication server 128, and/or the content server 104. The authentication application 112 may generate an authentication challenge 106 of a challenge response authentication protocol. The authentication application 112 may provide the authentication challenge 106 to the content server 104.

The content management application 102 or another application running on the content server 104 may receive the authentication challenge 106. The authentication challenge 106 may include data identifying the device that the authentication application 112 is attempting to authenticate. The content management application 102 may determine that the authentication challenge 106 is intended for the first computing device 168. The content management application 102 or the other application may provide the authentication challenge 106 to the first computing device 168.

In some implementations, the content server 104 and the first computing device 168 may be communicating using a Hypertext Transfer Protocol Secure (HTTPS) connection 122. In this case, the content management application 102 or the other application may provide the authentication challenge 106 to the first computing device 168 over the HTTPS connection 122. In some implementations, the content server 104 and the first computing device 168 may be communicating using a secure protocol other than HTTPS that is suitable for communication between two network elements or an evolvement of HTTPS.

The messaging client 172 or another application on the first computing device 168 may receive the authentication challenge 106. The messaging client 172 or other application may analyze the authentication challenge 106 and generate a response to the authentication challenge 106. The first computing device 168 may provide the authentication response 118 to the content server 104 over the HTTPS connection 122. The content server 104 may receive the authentication response 118 and provide the authentication response 108 to the authentication server 110.

The authentication application 112 may analyze the authentication response 108. Based on analyzing the authentication response 108, the authentication application 112 may determine whether to authenticate the first computing device 168. The authentication application 112 may generate an authentication result that indicates whether the first computing device 168 satisfied the authentication challenge 106, 120. The authentication server 110 may provide the authentication result to the content server 104. The content server 104 may provide the authentication result to the communication server 128.

The communication server 128 may receive the authentication result. If the authentication result indicated that the first computing device 168 satisfied the authentication challenge 106, 120, then the communication server 128 may initialize the MSRP tunnel 170, 174 between the first computing device 168 and the second computing device 144. In some implementations, the authentication challenge process may occur in response to the user 166 initiating the communication session with the user 142. If the authentication result indicated that the first computing device 168 did not satisfy the authentication challenge 106, 120, then the communication server 128 may bypass initializing the MSRP tunnel 170, 174 between the first computing device 168 and the second computing device 144. The communication server 128 may still facilitate communications between the first computing device 168 and the second computing device 144. In this case, the communications may be those types that do not utilize the MSRP tunnel 170, 174. These types may include SMS and/or MMS communications and other types of communications that may occur without an MSRP tunnel.

With the MSRP tunnel 170, 174 initialized, the messaging application 150 may process the text packet 126 and provide the text packet to the destination specified by the text packet 126. The text packet 126 may specify to transmit the packet to the second computing device 144. The communication server 128 may transmit the text packet 176 to the second computing device 144. The messaging client 146 may process the text packet 176 and output the text included in the text packet 176 on the interface of the messaging client 146 where the user 142 can read the text.

In stage C, the communication between the user 166 and the user 142 may continue. The user 166 may wish to send a file 164 to the user 142. The file 164 may be a video. In response to the user 166 selecting the file 164 and indicating to send the file 164 to the user 142, the messaging application 150 or the messaging client 172 may take various actions.

The messaging client 172 may provide the file 164 to the content management application 102 over the HTTPS connection 122. This action may be in response to an instruction from the messaging application 150 and in response to satisfying the authentication challenge. This action may also be based on determining that the size of the file 164 is between a lower threshold file size and an upper threshold file size. For example, the lower threshold file size may be ten megabytes and the upper threshold file size may be one hundred megabytes. In some implementations, the messaging client 172 may compress the size of the file 164 if the size of the file 164 is above the upper threshold file size to less than the upper threshold file size.

The content management application 102 may receive the file 164. The content management application 102 may store the file 164 and generate a link to access the file 164. For example, the link may be https://video.link/abc123. The content management application 102 may generate a password for the link. In some implementations, the password may be randomly generated by the content management application 102. In some implementations, the content management application 102 may request that the user 166 or the messaging client 172 provide the password. In some implementations, the content management application 102 may use a predetermined password. The content management application 102 may choose a password selection technique based on a preference of the user 166. The content management application 102 may choose a password selection technique based on a communication protocol being used by the messaging application 150 between the first computing device 168 and the second computing device 144. In some implementations, the content management application 102 may choose the predetermined password based on a wireless network to which the second computing device 144 is connected. For example, if the wireless network is different than the wireless network to which the first computing device 168 is connected, then the management application may choose the predetermined password.

In stage D, the content management application 102 generates the link and password packet 124 that includes the link to the file 164 and the password to access the link. The content server 104 provides link and password packet 124 to the first computing device 168 over the HTTPS connection 122. The messaging client 172 may receive the link and password packet 124 but not display the link or the password to the user 166.

In stage E, the user 166 may add a message 152 to the file 164 in the interface of the messaging client 172. For example, the user 166 may add the message 152, "Here is the video." The user 166 may type the message 152 into the interface of the messaging client 172 or speak the message 152 to the first computing device 168. The messaging client 172 may generate a text packet 158 that includes the message 152. In some implementations, the text packet 158 may also include the link and password 156. In this case, the messaging client 172 may combine the message 152, the link, and the password in the same packet and transmit that packet to the communication server 128 over the MSRP tunnel 170. In some implementations, the messaging client 172 may separate the message 152 into a text packet 158 and the link and password in a separate link and password packet 156. In this case, the first computing device 168 may provide the text packet 158 and the link and password packet 156 to the communication server 128.

In stage F, the messaging application 150 analyzes the text packet 158 and the link and password packet 156 and determines a destination for the text packet 158 and the link and password packet 156. The text packet 158 and the link and password packet 156 may specify to transmit the text packet 158 and the link and password packet 156 to the second computing device 144. With the MSRP tunnel 174 connecting the communication server 128 and the second computing device 144, the messaging application 150 generates a text packet 138 that includes the text from the text packet 158 and a link and password packet 140 that includes the link and password from the link and password packet 156. In some implementations, the text packet 138 and the link and password packet 140 may be combined into a single packet.

The communication server 128 transmits the text packet 138 and the link and password packet 140 to the second computing device 144 over the MSRP tunnel 174. The text packet 138 may include instructions or be encoded such that the messaging client 146 receives the text packet 138 and displays the text included in the text packet on an interface of the messaging client 146 for the user 142 to read. The link and password packet 140 may include instructions or be encoded such that the messaging client 146 does not display the link and password packet 140 on the interface of the messaging client. In this way, the link and the password are hidden from the user 142.

In stage G, the messaging client 146 analyzes the link and password packet 140. The instructions or encoding of the link and password packet 140 may specify how to use the link and password to access the corresponding media. Based on the instructions or the encoding of the link and password packet 140 or preexisting instructions, the messaging client 146 may generate an HTTPS GET request 130 and include the link in the HTTPS GET request 130. The instructions or the encoding of the link and password packet 140 or the preexisting instructions may include data identifying the content server 104 and instructions to transmit the HTTPS GET request 130 to the content server 104.

The second computing device 144 may transmit the HTTPS GET request 130 to the content server 104 over the HTTPS connection 114. In some implementations, content server 104 may receive the HTTPS GET request 130 and the content management application 102 may determine that a password is needed to access the link included in the HTTPS GET request 130. In this case, the content server 104 may transmit a request for a password to the second computing device 144. In response, the messaging client 146 may generate the password packet 134 that includes the password. The second computing device 144 may provide the password packet 134 to the content server 104 over the HTTPS connection 114.

In some implementations, the second computing device 144 may transmit the HTTPS GET request 130 and the password packet 134 to the content server 104 over the HTTPS connection 114 without the second computing device 144 receiving a request for the password. In this case, the password packet 134 may be a separate packet from the HTTPS GET request 130. There may be security issues with including the password in the HTTPS GET request 130.

The content server 104 receives the HTTPS GET request 130 and the password packet 134 over the HTTPS connection 114. The content management application 102 processes the HTTPS GET request 130 and the password packet 134 and accesses a storage device or medium that includes the file identified by the link in the HTTPS GET request 130.

In stage H, the content management application 102 generates a file packet 116 that includes the file linked by the link in the HTTPS GET request 130. The content management application 102 may generate the file packet 116 to include the file based on the password of the password packet 134 matching the password for the link. The content server 104 may provide the file packet 116 to the second computing device 144 over the HTTPS connection 114. The messaging client 146 may process the file packet 116 and present the file in the interface of the messaging client 146. The user 142 may then view the file.

The messaging client 146 may present the file in the interface of the messaging client 146 without presenting any indication of the link or the password. The messaging client 146 may not indicate that the messaging client 146 is receiving the file from a device or application that is different than the device or application that is providing the text of the other messages from the user 166.

In some implementations, the content management application 102 may compare the password from the password packet 134 to the stored password for the link and determine that the passwords do not match. In this case, the content management application 102 may generate a notification indicating that the password is incorrect and generate request for a different password. The content server 104 may provide the notification and request to the second computing device 144. The messaging client 146 may process the notification and request and update the interface of the messaging client. The interface update may include a request for the user 142 to enter the password and/or enter a message for the user 166. The user 142 may indicate to the user 166 that the user 142 is unable to view the file. The user 166 may attempt to send the file using an alternate means.

In stage I, the user 142 may view the file and continue the chat session with the user 166. The user 142 may enter a message into an interface of the messaging client 146. For example, the user 142 may enter the message, "What a great video!" The messaging client 146 may generate the message packet 136 that includes the message entered by the user 142. The second computing device 146 may provide the message packet 136 to the communication server 128 over the MSRP tunnel 174. The messaging application 150 may analyze the message packet 136 that may specify the sending device and the recipient device. The messaging application 150 may determine that the first computing device 168 is the recipient of the message packet 136. The messaging application 150 may generate the message packet 160 that may be the same as the message packet 136 or different. The communication server 128 may transmit the message packet 160 to the first computing device 168 over the MSRP tunnel 170. The messaging client 172 may analyze the message packet 160 and output the message included in the message packet to the interface of the messaging client 172. The user 166 may then view the message on the interface of the messaging client 172.

Figure 2:
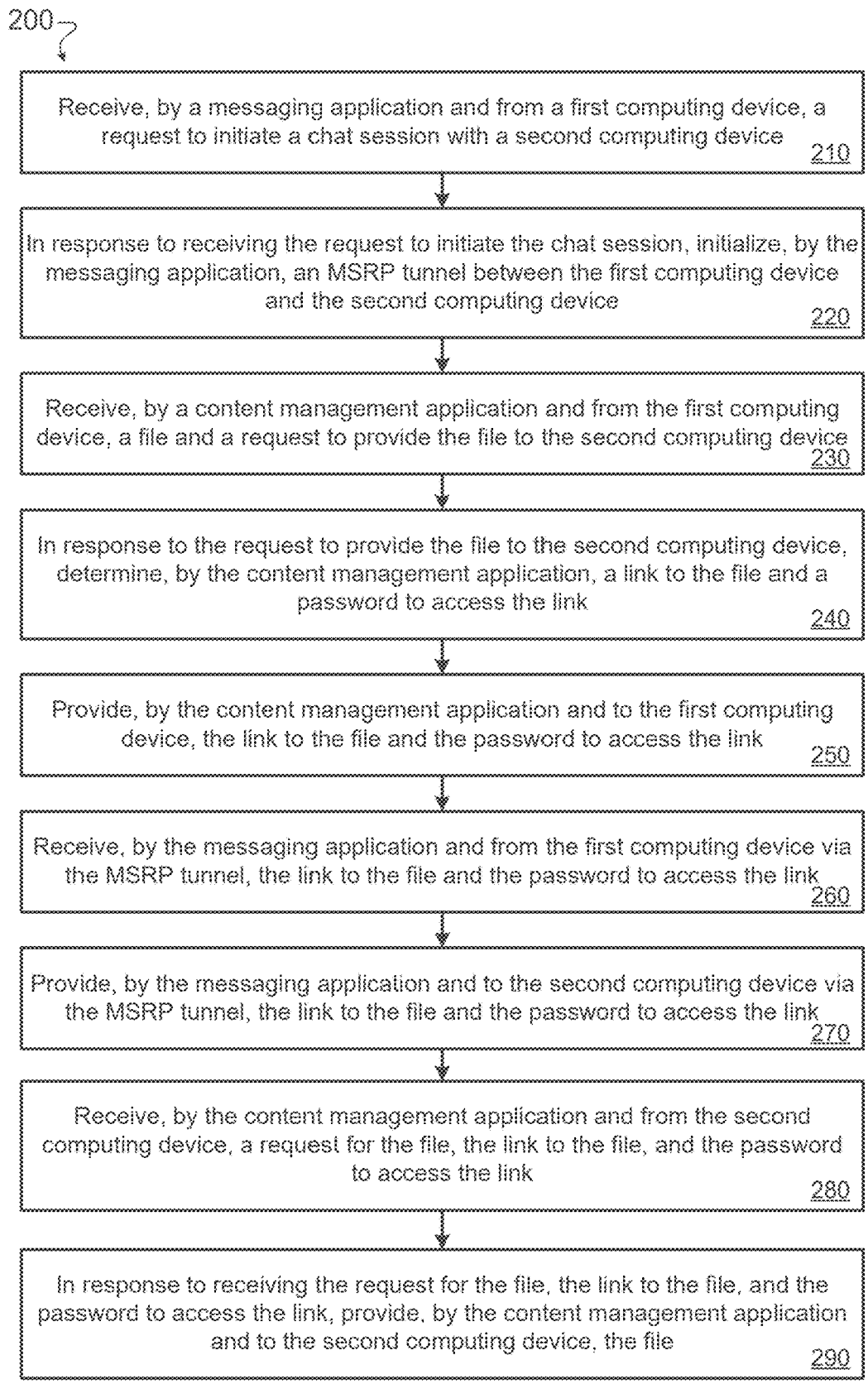
FIG. 2 is a flowchart of an example process for securely transferring a file from a first computing device to a second computing device during a chat session.

FIG. 2 is a flowchart of an example process 200 for securely transferring a file from a first computing device 168 to a second computing device 144 during a chat session. In general, the process 200 receives a link to the file and a password for the link. The process 200 provides the link and the password to a receiving computing device. The process 200 uses https to transmit the link and the password and receive the file. The process 200 will be described as being performed by the content management application 102 running on the content server 104 and/or the messaging application 150 running on the communication server 128 of FIG. 1 and will include references to other components in FIG. 1. The process 200 may be performed by a single computing device or split across multiple computing device that may include virtual devices. In some implementations, the process 200 may be performed by the computer system 580 of FIG. 5 described below.

The messaging application 150 receives, from a first computing device 168, a request 162 to initiate a chat session with a second computing device 144 (210). In some implementations, the request 162 to initiate a chat session may include an initial message 126 to provide to the second computing device 144. In some implementations, a communication server 128 may be running the messaging application 150. In some implementations, the server running the messaging application 150 may be a rich communication server that is configured to manage RCS communications.

In some implementations, the messaging application 150 may attempt to authenticate the first computing device 168. The authentication process may be in response to the request to initiate the chat session and may be performed by another application that may be running on another device. The messaging application 150 may communicate with an authentication server 110 that may be running an authentication application 112. The communication may be via a content server 104. The authentication application 112 may verify that the first computing device 168 is capable of supporting RCS communications over an MSRP tunnel. In some implementations, the authentication process may include the content server 104 authenticating a token of the first computing device 168 against the authentication server 110.

In response to receiving the request to initiate the chat session, the messaging application 150 initializes a message session relay protocol (MSRP) tunnel 170, 174 between the first computing device 168 and the second computing device 144 (220). In some implementations, this initialization occurs because the authentication server 110 authenticated the first computing device 168. In some implementations, the authentication server 110 may also authenticate the second computing device 144, and this initialization occurs because the authentication server 110 authenticated the first computing device 168 and/or the second computing device 144. In some implementations, this initialization occurs independent of authenticating the first computing device 168 and/or the second computing device 144. In this case, the authentication may be part of the process of the content server 104 storing a file for transmission from the first computing device 168 to the second computing device 144.

The content management application 102 receives, from the first computing device 168, a file 164 and a request to provide the file to the second computing device 144 (230). In some implementations, the content management application 102 receives the file 164 and the request to provide the file to the second computing device 144 over an HTTPS connection 122. In some implementations, the content server 104 is running the content management application 102. In some implementations, the content server 104 and the communication server 128 are a same server. In some implementations, the content server 104 and the communication server 128 are different servers.

In some implementations, the messaging application 150 may initially detect that the user 166 is attempting to send a file. Some files may be directly passed to the second computing device 144. Other files may be managed by the content management application 102 during the delivery to the second computing device 144. The detection of the attempted sending of a file may be enough for the communication server 128 to request that the content server 104 manage the delivery of the file.

In some implementations, the user 166 may request, to the messaging client 172, additional security regarding the file transfer. In this case, the communication server 128 may request that the content server 104 manage the delivery of the file. In some implementations, the messaging application 150 and/or the content management application 102 may determine that the size of the file is within a particular range, such as between ten and one hundred megabytes, or greater than a threshold size, such as ten megabytes. In response to this determination, the communication server 128 may request that the content server 104 manage the delivery of the file. In some implementations, the content server 104 may require that the authentication server 110 authenticate the first computing device 168 before managing the delivery of the file.

In some implementations, the user 166 may request that restrictions be placed on the movement of the file. The user 166 may specify that the file should be accessible for a period of time before access expires. For example, the user 166 may request that the file be accessible for only three days. The user 166 may specify that the file should not be forwarded to users other than the original recipient or recipients. The content management application 102 may receive these requests and use them to determine whether to provide access to the file.

In response to the request to provide the file to the second computing device 144, the content management application 102 determines a link to the file and a password to access the link (240). In some implementations, the user 166 provides the password. This may be at the request of the user 166. In some implementations, the password may be predetermined. In the case of a predetermined password, the recipient devices may already store or have access to the predetermined password. These static passwords may be utilized if the recipient device receives wireless service from a wireless service provider other than the wireless service provider that provides wireless service to the first computing device 168.

The content management application 102 provides, to the first computing device 168, the link to the file and the password to access the link (250). In some implementations, the content management application 102 provides the link to the file and the password to access the link over the HTTPS connection 122. In some implementations, the movement of the file to the content server 104 and/or the generation and receipt of the link and password may be hidden to the user 166. The interface of the messaging client 172 may show the file being sent to the second computing device 144 but not the processing by the content management application 102. These aspects being hidden may be based on the MSRP tunnel 170 and/or the MSRP tunnel 174 remaining active. If the MSRP tunnel 170 and/or the MSRP tunnel 174 are inactive, then the movement of the file to the content server 104 and/or the generation and receipt of the link and password may be visible to the user 166.

The messaging application 150 receives, from the first computing device 168 via the MSRP tunnel 170, the link to the file and the password to access the link (260). The movement of the link to the file and the password to access the link may be hidden to the user 166.

The messaging application 150 provides, to the second computing device 144 via the MSRP tunnel 174, the link to the file and the password to access the link (270). In some implementations, the link to the file and the password to access the link may be hidden to a user 142 of the second computing device 144. In some implementations, the link to the file and the password to access the link may be hidden because the MSRP tunnel 174 is active.

The content management application 102 receives, from the second computing device 144, a request for the file, the link to the file, and the password to access the link (280). In some implementations, the second computing device 144 may provide the request for the file and the link to the file in an HTTPS GET request 130 over the HTTPS connection 114. In some implementations, the password may be included in a separate packet provided to the content management application 102 by the second computing device 144. In some implementations, the HTTPS GET request 130 and the communications between the second computing device 144 and the content server 104 may be hidden to the user 142.

In response to receiving the request for the file, the link to the file, and the password to access the link, the content management application 102 provides, to the second computing device 144, the file (290). In some implementations, the content management application 102 may provide the file 116 to the second computing device 144 over the HTTPS connection 114. In some implementations, the communications over the HTTPS connection 114 may be hidden to the user 142. In this way, the user 142 may see the file in the interface of the messaging client 146 but may not see evidence of the communications between the second computing device 144 and the content server 104.

In some implementations, the content messaging application 102 may analyze the HTTPS GET request 130 and determine whether the messaging client 146 is authorized to access the linked file. The content messaging application 102 may compare the expiration date and time of the link to the current date and time. The expiration date and time may be specified by the user 166. If the expiration date and time has passed, then the content messaging application 102 may generate a notification indicating that the link or file is not available. The user 142 may then determine an alternate means to access the file.

The content messaging application 102 may determine a number of times that the link has been accessed. If the number of times that the link has been accessed is less than or equal to a threshold number that may be set by the user 166, then the content messaging application 102 may provide the file 116 to the second computing device 144. If the number of times that the link has been accessed is greater than the threshold number, then the content messaging application 102 may generate a notification indicating that the link or file is not available.

In some implementations, the user 166 may specify that only certain users are able to access the file. In this case, the content messaging application 102 may store data identifying those users and compare a user identifier included in the HTTPS GET request 130 to the users identified by the user 166. If there is a match, then the content messaging application 102 may provide the file 116 to the second computing device 144. If there is not a match, then the content messaging application 102 may provide a notification indicating that the user 142 is unable to access a file sent by the user 166.

In some implementations, the user 142 may attempt to forward the file to another user. The user 142 may select the file in the interface of the messaging client 146, select the other user, and indicate to forward the file to the other user. If the computing device of the other user is connected to the communication server 128 over an MSRP tunnel, then the messaging application 150 may provide the file in a similar manner as providing the file to the second computing device 144. If the computing device of the other user is not connected to the communication server 128 over an MSRP tunnel, then the messaging application 150 may provide the link and the password to the link such that the link and the password to the link are visible to the user of the other computing device. The other user may access the link and provide the password to the content server 104 to access the file.

FIG. 3 is a flowchart of an example process 300 for securely transferring a file from a first computing device 168 to a second computing device 144 during a chat session and while the second computing device 144 has disconnected from the network and reconnected to another network. In general, the process 300 receives a link to the file and a password for the link. The process 300 provides the link and the password to a receiving computing device. The receiving computing device temporarily goes offline. When the receiving computing device returns to be online, it may be on a different network. In this case, the process 300 may uses https to transmit the link, but the user 142 may have to input the password to receive the file. The process 300 will be described as being performed by the content management application 102 running on the content server 104 and/or the messaging application 150 running on the communication server 128 of FIG. 1 and will include references to other components in FIG. 1. The process 300 may be performed by a single computing device or split across multiple computing devices that may include virtual devices. In some implementations, the process 300 may be performed by the computer system 580 of FIG. 5 described below.

The first six features of the process 300 are similar to the first six features of the process 200 of FIG. 2. The details of features 210, 220, 230, 240, 250, and 260 of FIG. 2 are applicable to the features 305, 310, 315, 320, 325, and 330 FIG. 3 and are not repeated.

The messaging application 150 receives, from a first computing device 168, a request to initiate a chat session with a second computing device (305). In response to receiving the request to initiate the chat session, the messaging application 150 initializes a message session relay protocol (MSRP) tunnel 170 between the first computing device 168 and the second computing device 144 (310). The content management application 102 receives, from the first computing device 168, a file 164 and a request to provide the file to the second computing device 144 (315). In response to the request to provide the file to the second computing device 144, the content management application 102 determines a link to the file and a password to access the link (320). The content management application 102 provides, to the first computing device 168, the link to the file and the password to access the link (325). The messaging application 150 receives, from the first computing device 168 via the MSRP tunnel 170, the link to the file and the password to access the link (330).

The messaging application 150 determines that the second computing device 144 and the messaging application 150 are not communicating by the MSRP tunnel 174 or an additional MSRP tunnel (335). The second computing device 144 may not be communicating with the communication server 128 over the MSRP tunnel for a variety of reasons. In some implementations, the messaging client 146 and/or the second computing device 144 may not support an MSRP tunnel with the communication server 128 and/or the messaging application 150. In some implementations, the second computing device 144 may be on a different wireless network than the first computing device 168.

In some implementations, the second computing device 144 may initially be communicating with the communication server 128 over the MSRP tunnel 174. The second computing device 144 may temporarily go offline. The second computing device 144 may reconnect to a different network than originally connected to. In some instances, the second computing device 144 may be unable to reestablish the MSRP tunnel 174 with the communication server 128.

The messaging application 150 provides, to the second computing device 144, the link to the file and the password to access the link such that the link to the file and the password to access the link is visible to a user of the second computing device (340). Without the MSRP tunnel 174 between the communication server 128 and the second computing device 144, the messaging application 150 may generate a packet that includes the link to the file and the password. The packet may be similar to the packet 176 that includes text entered by the user 166. In this case, the link to the file and the password may be displayed to the user 142 on the interface of the messaging client 146 in a similar manner to the text in the packet 176.

The content management application 102 receives, from the second computing device 144, a request for the file and the link to the file (345). The content server 104 may receive the request and the link over the HTTPS connection 114. The user 142 may view the link to the file and the password in the interface of the messaging client 146. The user 142 may select the link to the file or enter the link in a browser. Either of these actions may generate an HTTPS GET request 130 that specifies the link to the video. The HTTPS GET request 130 may also include data identifying the second computing device 144 and/or the user 142. The content management application 102 may receive the HTTPS GET request 130 and process the HTTPS GET request 130.

The content management application 102 provides, to the second computing device 144, a request for the password to access the link (350). The content management application 102 may determine that the link requires a password. In this case, the content management application 102 may generate a request for the password to access the link and provide that request to the second computing device 144 over the HTTPS connection 114.

In some implementations, the content management application 102 may receive the password with the HTTPS GET request 130 because the password is included in the HTTPS GET request 130, because the password was provided by the messaging client 146 automatically, or because the user 142 provided the password.

The content management application 102 receives, from the second computing device 144, the password to access the link (355). The messaging client 146 may generate a request for the password to provide to the interface of the messaging client 146. The user 142 may view the request and enter the password. In some implementations, the messaging client 146 may receive the request and automatically identify the password in the chat session and provide the password to the content server 104. The content management application 102 may compare the password to the password for the link and determine whether to output the file.

In response to receiving the password to access the link, the content management application 102 provides, to the second computing device 144, the file (360). The messaging client 146 may receive the file and output the file to the interface of the messaging client 146. The user 142 may view the file and continue interacting with the user 166 during the chat session.

In some implementations, the password may not be the correct password. In this case, the content management application 102 may provide the second computing device 144 with a notification that indicates the password is incorrect. The user 142 may take an action such as inputting an updated password, request an updated password from the user 166, requesting that the user 166 resend the file, and/or any other similar action.

Figure 4:
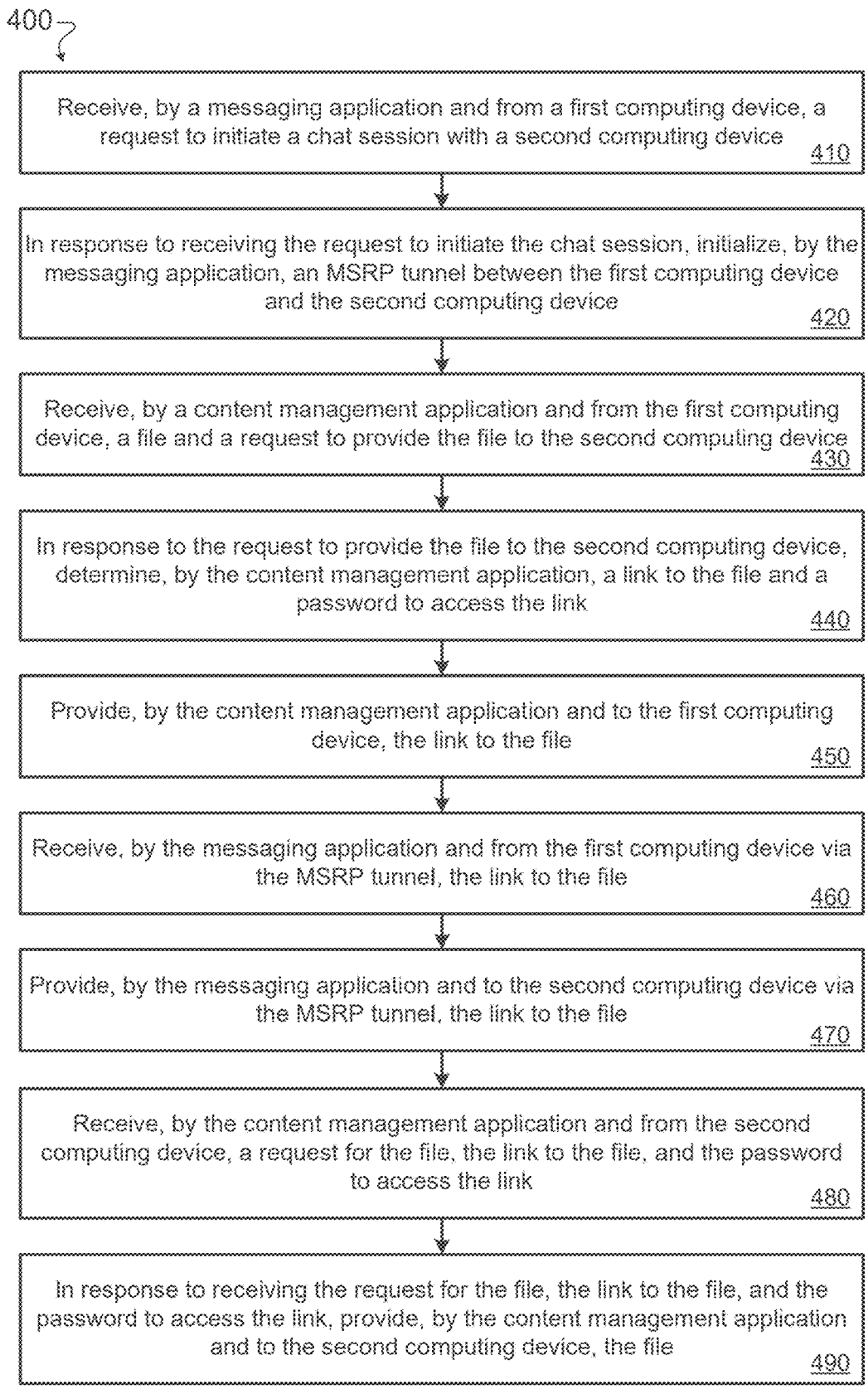
FIG. 4 is a flowchart of an example process for securely transferring a file from a first computing device to a second computing device during a chat session using a predetermined password.

FIG. 4 is a flowchart of an example process 400 for securely transferring a file from a first computing device 168 to a second computing device 144 during a chat session using a predetermined password. In general, the process 400 receives a link to the file. The process 400 provides the link to a receiving computing device. The process 400 uses https to transmit the link and a predetermined password and receive the file. The process 400 will be described as being performed by the content management application 102 running on the content server 104 and/or the messaging application 150 running on the communication server 128 of FIG. 1 and will include references to other components in FIG. 1. The process 400 may be performed by a single computing device or split across multiple computing devices that may include virtual devices. In some implementations, the process 400 may be performed by the computer system 580 of FIG. 5 described below.

The first three features of the process 400 are similar to the first three features of the process 200 of FIG. 2. The details of features 210, 220, and 230 of FIG. 2 are applicable to the features 410, 420, and 430 FIG. 4 and are not repeated.

The messaging application 150 receives, from a first computing device 168, a request to initiate a chat session with a second computing device 144 (410). In response to receiving the request to initiate the chat session, the messaging application 150 initializes a message session relay protocol (MSRP) tunnel between the first computing device 168 and the second computing device 144 (420). The content management application 102 receives, from the first computing device 168, a file and a request to provide the file to the second computing device 144 (430).

In response to the request to provide the file to the second computing device 144, the content management application 102 determines, a link to the file and a password to access the link (440). In some implementations, the password may be a predetermined password. The predetermined password may be generated by the first computing device 168, the second computing device 144, the communication server 128, the content server 104, the user 166, the user 142, and/or any other device or user. The first computing device 168, the second computing device 144, the communication server 128, the content server 104, and/or any other device may distribute the password to the other devices. This may be in advance of any chat sessions and/or a user attempting to send a file.

The content management application 102 provides, to the first computing device 168, the link to the file (450). Because the password is predetermined and has been distributed to the first computing device 168, it is not necessary for the content management application 102 to provide the password to the first computing device 168. In some implementations, the content management application 102 may include an identifier for the predetermined password in the event that there are multiple predetermined passwords that may be used to secure links during the chat session. In some implementations, the content server 102 provides the link to the file to the first computing device 168 over the HTTPS connection 122.

The messaging application 150 receives, from the first computing device 168 via the MSRP tunnel 170, the link to the file (460). Because the first computing device 168 did not receive the password for the link, the first computing device 168 may not include a password in the packet provided to the messaging application 150. In some implementations, the messaging application 150 may receive data identifying the password to the link to the file and/or data indicating that the password is a predetermined password.

The messaging application 150 provides, to the second computing device 144 via the MSRP tunnel, the link to the file (470). The messaging application 150 may provide data identifying the link to the password and/or data identifying the password to the link. The messaging client 146 may determine the password for the link based on any unique data in the link and/or based on the data identifying the password. The messaging client 146 may have previously received and stored the password.

The content management application 102 receives, from the second computing device 144, a request for the file, the link to the file, and the password to access the link (480). The password may be the password that the second computing device 144 previously received and stored for later access.

In response to receiving the request for the file, the link to the file, and the password to access the link, the content management application 102 provides, to the second computing device 144, the file (490). The movement of the password and the link may be hidden from the user 142 in the same manner that the password and link was hidden from the user 142 in process 200 of FIG. 2. The user 142 may view the file in the interface of the messaging client 146 and continue to interact with the user 166 during the chat session. The password may be used again for subsequent file sharing.

Figure 5:
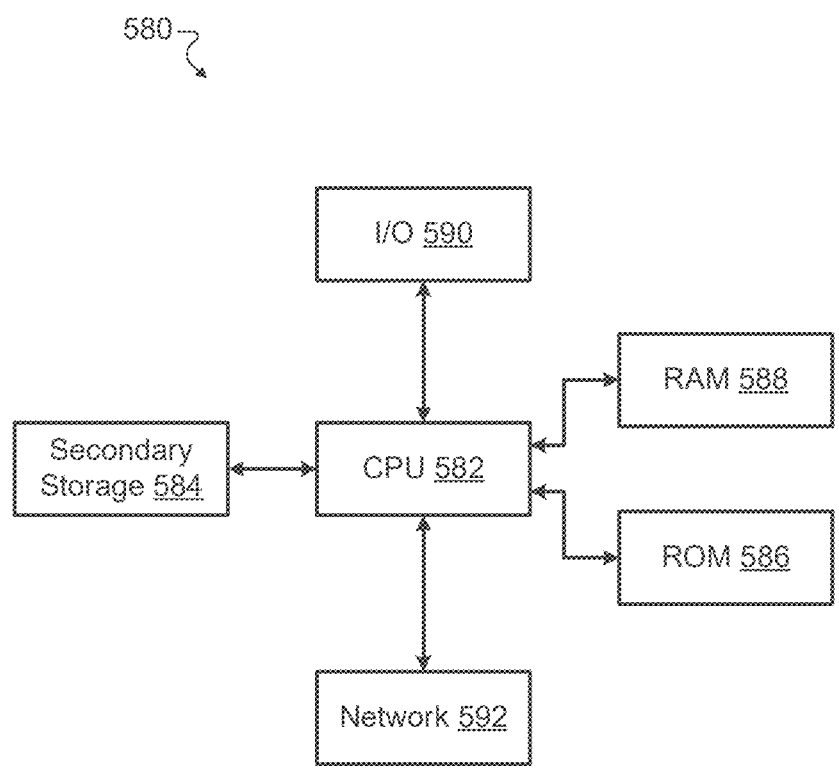
FIG. 5 illustrates an example computer system.

FIG. 5 illustrates an example computer system 580 suitable for implementing one or more implementations disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 580 is turned on or booted, the CPU 582 may execute a computer program or application. For example, the CPU 582 may execute software or firmware stored in the ROM 586 or stored in the RAM 588. In some cases, on boot and/or when the application is initiated, the CPU 582 may copy the application or portions of the application from the secondary storage 584 to the RAM 588 or to memory space within the CPU 582 itself, and the CPU 582 may then execute instructions that the application is comprised of. In some cases, the CPU 582 may copy the application or portions of the application from memory accessed via the network connectivity devices 592 or via the I/O devices 590 to the RAM 588 or to memory space within the CPU 582, and the CPU 582 may then execute instructions that the application is comprised of. During execution, an application may load instructions into the CPU 582, for example load some of the instructions of the application into a cache of the CPU 582. In some contexts, an application that is executed may be said to configure the CPU 582 to do something, e.g., to configure the CPU 582 to perform the function or functions promoted by the subject application. When the CPU 582 is configured in this way by the application, the CPU 582 becomes a specific purpose computer or a specific purpose machine.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584. The secondary storage 584, the RAM 588, and/or the ROM 586 may be referred to in some contexts as computer readable storage media and/or non-transitory computer readable media.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 592 may provide wired communication links and/or wireless communication links (e.g., a first network connectivity device 592 may provide a wired communication link and a second network connectivity device 592 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In some implementations, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 592 may enable the processor 582 to communicate with the Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 582 executes instructions, codes, computer programs, scripts which it accesses from hard disk, floppy disk, optical disk (these various disk-based systems may all be considered secondary storage 584), flash drive, ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 584, for example, hard drives, floppy disks, optical disks, and/or other device, the ROM 586, and/or the RAM 588 may be referred to in some contexts as non-transitory instructions and/or non-transitory information.

In some implementations, the computer system 580 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some implementations, virtualization software may be employed by the computer system 580 to provide the functionality of a number of servers that is not directly bound to the number of computers in the computer system 580. For example, virtualization software may provide twenty virtual servers on four physical computers. In some implementations, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In some implementations, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 580, at least portions of the contents of the computer program product to the secondary storage 584, to the ROM 586, to the RAM 588, and/or to other non-volatile memory and volatile memory of the computer system 580. The processor 582 may process the executable instructions and/or data structures in part by directly accessing the computer program product, for example by reading from a CD-ROM disk inserted into a disk drive peripheral of the computer system 580. Alternatively, the processor 582 may process the executable instructions and/or data structures by remotely accessing the computer program product, for example by downloading the executable instructions and/or data structures from a remote server through the network connectivity devices 592. The computer program product may comprise instructions that promote the loading and/or copying of data, data structures, files, and/or executable instructions to the secondary storage 584, to the ROM 586, to the RAM 588, and/or to other non-volatile memory and volatile memory of the computer system 580.

In some contexts, the secondary storage 584, the ROM 586, and the RAM 588 may be referred to as a non-transitory computer readable medium or a computer readable storage media. A dynamic RAM implementation of the RAM 588, likewise, may be referred to as a non-transitory computer readable medium in that while the dynamic RAM receives electrical power and is operated in accordance with its design, for example during a period of time during which the computer system 580 is turned on and operational, the dynamic RAM stores information that is written to it. Similarly, the processor 582 may comprise an internal RAM, an internal ROM, a cache memory, and/or other internal non-transitory storage blocks, sections, or components that may be referred to in some contexts as non-transitory computer readable media or computer readable storage media.

While several implementations have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various implementations as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer-implemented method for securely transmitting a file during a chat session by transmitting a link to the file and a password to access the link, comprising:
   receiving, by a messaging application and from a first computing device, a request to initiate the chat session with a second computing device;
   in response to receiving the request to initiate the chat session, initializing, by the messaging application, a message session relay protocol (MSRP) tunnel between the first computing device and the second computing device;
   receiving, by a content management application and from the first computing device, the file and a request to provide the file to the second computing device;
   in response to the request to provide the file to the second computing device, determining, by the content management application, the link to the file and the password to access the link;
   providing, by the content management application and to the first computing device, the link to the file and the password to access the link;
   receiving, by the messaging application and from the first computing device via the MSRP tunnel, the link to the file and the password to access the link;
   providing, by the messaging application and to the second computing device via the MSRP tunnel, the link to the file and the password to access the link;
   receiving, by the content management application and from the second computing device, a request for the file, the link to the file, and the password to access the link; and
   in response to receiving the request for the file, the link to the file, and the password to access the link, providing, by the content management application and to the second computing device, the file.

2. The method of claim 1, wherein:
   receiving, by the content management application and from the first computing device, the file and the request to provide the file to the second computing device comprises receiving, by the content management application, from the first computing device, and via a first hypertext transfer protocol secure (HTTPS) connection, the file and the request to provide the file to the second computing device;
   providing, by the content management application and to the first computing device, the link to the file and the password to access the link comprises providing, by the content management application, to the first computing device, and via the first HTTPS connection, the link to the file and the password to access the link;
   receiving, by the content management application and from the second computing device, the request for the file, the link to the file, and the password to access the link comprises receiving, by the content management application, from the second computing device, and via a second HTTPS connection, the request for the file, the link to the file, and the password to access the link; and
   providing, by the content management application and to the second computing device, the file comprises providing, by the content management application, to the second computing device, and via the second HTTPS connection, the file.

3. The method of claim 1, wherein a first server is running the content management application and a second server is running the messaging application.

4. The method of claim 1, wherein the link to the file and the password to access the link are hidden from a first user of the first computing device and a second user of the second computing device.

5. The method of claim 1, wherein receiving, by the content management application and from the second computing device, the request for the file, the link to the file, and the password to access the link comprises receiving, by the content management application and from the second computing device, a hypertext transfer protocol secure (HTTPS) GET request that includes the link to the file and an additional packet that includes the password to access the link.

6. The method of claim 1, comprising:
   in response to receiving the request to initiate the chat session, providing, by the messaging application and to the content management application, a request to authenticate the first computing device;
   providing, by the content management application and to an authentication application, the request to authenticate the first computing device;

receiving, by the content management application and from the authentication application, data indicating a successful authentication of the first computing device; and receiving, by the messaging application and from the content management application, the data indicating the successful authentication of the first computing device, wherein initializing, by the messaging application, a message session relay protocol (MSRP) tunnel between the first computing device and the second computing device is in response to receiving the data indicating the successful authentication of the first computing device.

7. The method of claim 1, comprising:
determining, by the messaging application, that a user of the first computing device is attempting to transmit a file to the second computing device;
comparing, by the messaging application, a size of the file to an upper threshold file size and a lower threshold file size;
determining, by the messaging application, that the size of the file is between the upper threshold file size and the lower threshold file size; and
based on determining that the size of the file is between the upper threshold file size and the lower threshold file size, providing, by the messaging application and to the content management application, a request to manage the transmission of the file from the first computing device to the second computing device,
wherein receiving, by the content management application and from the first computing device, the file and the request to provide the file to the second computing device is in response to the request to manage the transmission of the file from the first computing device to the second computing device.

8. The method of claim 1, wherein determining, by the content management application, the link to the file and the password to access the link comprises providing, by the content management application and to the first computing device, a request to provide the password.

9. The method of claim 1, comprising:
receiving, by the content management application and from the first computing device, a request to limit forwarding of the file and a request to limit access to the file.

10. The method of claim 1, comprising:
receiving, by the messaging application and from the second computing device, a request to forward the file to a third computing device;
determining, by the messaging application, that an additional MSRP tunnel is not connecting the second computing device and the third computing device; and
based on that the additional MSRP tunnel is not connecting the second computing device and the third computing device, providing, by the messaging application and to the third computing device, the link to the file and the password such that the link to the file and the password will be visible by a user of the third computing device.

11. A computer-implemented method for securely transmitting a file during a chat session between devices that are unable to maintain a message session relay protocol (MSRP) tunnel during the chat session, comprising:
receiving, by a messaging application and from a first computing device, a request to initiate the chat session with a second computing device;

in response to receiving the request to initiate the chat session, initializing, by the messaging application, the MSRP tunnel between the first computing device and the second computing device;
receiving, by a content management application and from the first computing device, the file and a request to provide the file to the second computing device;
in response to the request to provide the file to the second computing device, determining, by the content management application, a link to the file and a password to access the link;
providing, by the content management application and to the first computing device, the link to the file and the password to access the link;
receiving, by the messaging application and from the first computing device via the MSRP tunnel, the link to the file and the password to access the link;
determining, by the messaging application, that the second computing device and the messaging application are not communicating by the MSRP tunnel or an additional MSRP tunnel;
providing, by the messaging application and to the second computing device, the link to the file and the password to access the link such that the link to the file and the password to access the link is visible to a user of the second computing device;
receiving, by the content management application and from the second computing device, a request for the file and the link to the file;
providing, by the content management application and to the second computing device, a request for the password to access the link;
receiving, by the content management application and from the second computing device, the password to access the link; and
in response to receiving the password to access the link, providing, by the content management application and to the second computing device, the file.

12. The method of claim 11, wherein after receiving, by the messaging application and from the first computing device via the MSRP tunnel, the link to the file and the password to access the link and before determining, by the messaging application, that the second computing device and the messaging application are not communicating by the MSRP tunnel or an additional MSRP tunnel, the second computing device disconnects from a first network and reconnects to a second network.

13. The method of claim 11, wherein a first server is running the content management application and a second server is running the messaging application.

14. The method of claim 11, wherein the link to the file and the password to access the link are hidden from a first user of the first computing device.

15. The method of claim 11, comprising:
in response to receiving the request to initiate the chat session, providing, by the messaging application and to the content management application, a request to authenticate the first computing device;
providing, by the content management application and to an authentication application, the request to authenticate the first computing device;
receiving, by the content management application and from the authentication application, data indicating a successful authentication of the first computing device; and receiving, by the messaging application and from the content management application, the data indicating the successful authentication of the first computing device, wherein initializing, by the messaging application, a message session relay protocol (MSRP) tunnel between the first computing device and the second computing device is in response to receiving the data indicating the successful authentication of the first computing device.

16. The method of claim 11, comprising:

determining, by the messaging application, that a user of the first computing device is attempting to transmit a file to the second computing device;

comparing, by the messaging application, a size of the file to an upper threshold file size and a lower threshold file size;

determining, by the messaging application, that the size of the file is between the upper threshold file size and the lower threshold file size; and based on determining that the size of the file is between the upper threshold file size and the lower threshold file size, providing, by the messaging application and to the content management application, a request to manage the transmission of the file from the first computing device to the second computing device, wherein receiving, by the content management application and from the first computing device, the file and the request to provide the file to the second computing device is in response to the request to manage the transmission of the file from the first computing device to the second computing device.

17. The method of claim 11, wherein determining, by the content management application, the link to the file and the password to access the link comprises providing, by the content management application and to the first computing device, a request to provide the password.

18. The method of claim 11, comprising:

receiving, by the content management application and from the first computing device, a request to limit forwarding of the file and a request to limit access to the file.

19. A system for securely transmitting a file during a chat session by transmitting a link that is to the file and that is protected by a password, comprising:

a communication server comprising:
  at least one non-transitory memory;
  at least one processor; and
  a messaging application stored in the at least one non-transitory memory of the communication server, that when executed by the at least one processor of the communication server, causes the at least one processor of the communication server to be configured to:
    receive, from a first computing device, a request to initiate the chat session with a second computing device; and
    in response to receiving the request to initiate the chat session, initialize a message session relay protocol (MSRP) tunnel between the first computing device and the second computing device;

a content server comprising:
  at least one non-transitory memory;
  at least one processor; and
  a content management application stored in the at least one non-transitory memory of the content server, that when executed by the at least one processor of the content server, causes the at least one processor of the content server to be configured to:
    receive, from the first computing device, the file and a request to provide the file to the second computing device;
    in response to the request to provide the file to the second computing device, determine a link to the file and the password to access the link; and
    provide, to the first computing device, the link to the file;

wherein the messaging application, when executed by the at least one processor of the communication server, causes the at least one processor of the communication server to be further configured to:
  receive, from the first computing device via the MSRP tunnel, the link to the file; and
  provide, to the second computing device via the MSRP tunnel, the link to the file; and wherein the content management application, when executed by the at least one processor of the content server, causes the at least one processor of the content server to be further configured to:
  receive, from the second computing device, a request for the file, the link to the file, and the password to access the link; and
  in response to receiving the request for the file, the link to the file, and the password to access the link, provide, to the second computing device, the file.

20. The system of claim 19, wherein the password to access the link is a predetermined password that is accessible by the second computing device.

* * * * *